United States Patent
Danner

(10) Patent No.: US 6,437,077 B1
(45) Date of Patent: Aug. 20, 2002

(54) BLOCKED OLIGOMERIC ISOCYANATES, THEIR PRODUCTION AND USE

(75) Inventor: Bernard Danner, Riedisheim (FR)

(73) Assignee: Clariant Finance (BVI) Limited, Road Town (VG)

( * ) Notice: Subject to any disclaimer, the term of this patent is extended or adjusted under 35 U.S.C. 154(b) by 0 days.

(21) Appl. No.: 09/647,957

(22) PCT Filed: Apr. 7, 1999

(86) PCT No.: PCT/IB99/00603
§ 371 (c)(1),
(2), (4) Date: Dec. 8, 2000

(87) PCT Pub. No.: WO99/52961
PCT Pub. Date: Oct. 21, 1999

(30) Foreign Application Priority Data

Apr. 9, 1998 (EP) .............................................. 98810306

(51) Int. Cl.[7] .......................... C08L 75/08; C08G 18/30; B05D 3/10
(52) U.S. Cl. ........................... 528/73; 528/76; 524/463; 524/590; 524/591; 524/839; 427/389.9
(58) Field of Search .................................. 524/463, 590, 524/591, 838; 528/73, 76; 427/389.9

(56) References Cited

U.S. PATENT DOCUMENTS 4,118,538 A * 10/1978 Balland
5,714,082 A * 2/1998 Boardman et al.
5,723,536 A * 3/1998 Baumbach et al.

FOREIGN PATENT DOCUMENTS

| EP | 0445077 | * | 9/1991 |
| EP | 0500495 | * | 8/1992 |
| EP | 0537578 | * | 4/1993 |
| WO | WO 97/12924 | | 4/1997 |

* cited by examiner

Primary Examiner—Tae H. Yoon

(57) ABSTRACT

Self-dispersible mixtures (G) of oligomeric isocyanates (C) reacted in part with polyethylene glycol monoalkyl ether (A), which optionally contains propyleneoxy units, and optionally with a chain extender (K) and exhaustively blocked with an isocyanate-blocking pyrazole (B) are useful as auxiliaries in the finishing of fibrous material with oleophobicizing and/or hydrophobicizing finishes (F) comprising fluorocarbon polymers.

17 Claims, No Drawings

BLOCKED OLIGOMERIC ISOCYANATES, THEIR PRODUCTION AND USE

BACKGROUND OF THE INVENTION

A popular way of conferring an oil-repellent and/or water-repellent finish on textile material is to use fluorocarbon polymers which provide a certain air and vapour permeability and also an easy care finish, to produce, for example, breathable finishes which are impermeable to water. For general use it is desirable for the finish to have certain fastnesses, particularly cleaning fastnesses, among which the fastness to washing, especially the permanence to washing, plays a particular role; a problem in this is that an impairment of the oleophobic and/or hydrophobic effect of the finish due to a clean with customary household detergents (by washing or shampooing, for example) requires a thermal after treatment, for example at 140° C. or higher (by ironing, for example), to be at least partially recovered—provided there is still product on the substrate after the clean. It is therefore especially desirable for the original properties (particularly the oil- and water-repellent properties and the vapour permeability or the easy care properties) to be essentially intact after one or more cleaning or washing operations, even without a thermal aftertreatment, if possible.

DE 19615116 A1 describes blocked polyisocyanates as crosslinker resins for organic polyhydroxy compounds for clearcoating baking finishes, these blocked polyisocyanates being prepared by reacting an isocyanurate-group-containing (cyclo)aliphatic polyisocyanate with a nonionic hydrophilic component (a Carbowax, for example), a monofunctional blocking agent and a hydrazide-group- containing stabilizing component and optionally certain chain extenders in a certain quantitative ratio, by first reacting the starting polyisocyanate in a non-exhaustive manner with the hydrophilic component and then with the blocking agent and thereafter reacting with the stabilizer and optionally with the chain extender.

EP 0537578 A2 describes the use, together with fluorochemicals, of blocked polyisocyanates which contain polyalkylene ether and have built-in ionic groups for the hydrophobicizing and oleophobicizing finishing of textiles. Such ionically modified products have the disadvantage that they are not necessarily compatible with other products of opposite ionicity, for example anionically modified products and synthetic resin components having a cationic character, since this can lead to precipitates in an aqueous medium.

Later U.S. Pat. No. 5,714,082 describes water- and oil-repellent, soil-repellent finishes with fluoro-chemicals, the use of an extender of the hydrocarbon urethane type (there the nonionic product HCT-3) in Example 42 thereof being designated as contributing to "deficiencies".

It has now been found that using the hereinbelow defined mixtures (G) of blocked oligomeric isocyanates surprisingly makes it possible to improve the oil- and water-repellent properties and also the fastnesses of the finishes mentioned at the outset.

SUMMARY OF THE INVENTION

The invention relates to the defined mixtures (G), compositions comprising these mixtures, the production of the mixtures and their use.

In a first aspect, the invention accordingly provides self-dispersible mixtures (G) of oligomeric isocyanates (C) reacted in part with polyethylene glycol monoalkyl ether (A), which optionally contains propyleneoxy units, and optionally with a chain extender (K) and exhaustively blocked with an isocyanate-blocking pyrazole (B).

DESCRIPTION OF THE PREFERRED EMBODIMENTS

The self-dispersible mixtures (G) can be formulated with water and optionally further additives to form aqueous dispersions (D).

The process for the production of the self-dispersible mixtures (G) is especially characterized in that
in a first process step
  (a) a minor proportion of the isocyanate groups in the oligomeric isocyanate (C) are reacted in the absence of protogenic solvents with polyethylene glycol monoalkyl ether (A), which optionally contains propyleneoxy units, to form a product (U1) and this product (U1) is then optionally converted into a product (U2) which has a higher NCO-based equivalent weight and which still contains reactive NCO groups,
and in a second process step
  (b) the remaining isocyanate groups are exhaustively blocked with isocyanate-blocking pyrazole (B).

For the production of the aqueous dispersions (D), the mixtures (G) thus produced can, preferably directly after their production, be mixed with water and optionally further additives.

As oligomeric isocyanates (C) are suitable generally known isocyanates, advantageously having two to ten NCO groups, for example hydrocarbon oligoisocyanates or oligomers of hydrocarbon diisocyanates, especially
  ($C_1$) oligomers of aliphatic diisocyanates or
  ($C_2$) diphenylmethane diisocyanate or polyphenylenepolymethylene polyisocyanates.

The monomeric aliphatic diisocyanates from which the oligomers ($C_1$) derive preferably have at least one isocyanate group bonded to a methylene. The oligomeric isocyanates ($C_1$) can be for example di-, tri- or tetramers of aliphatic, optionally cyclic diisocyanates having for example 2 to 16, preferably 4 to 10, carbon atoms in the basic hydrocarbon skeleton. Of these, hexamethylene diisocyanate, isophorone diisocyanate and 2,4,4-trimethylhexylene-1,6-diisocyanate are preferred, especially hexamethylene diisocyanate. The oligomers can be cyclic or open-chain; suitable trimers include in particular those having an isocyanurate or biuret structure, while suitable dimers include especially those having a uretidione structure; optionally it is also possible to use oligomers thereof.

The ether-forming alkyl radicals in (A) are in principle discretionary, but are preferably of low molecular weight; they preferably contain 1 to 4 carbon atoms. If desired, (A) can also contain propyleneoxy groups, in which case, however, the ethyleneoxy groups preferably outweigh the propyleneoxy groups.

The polyethylene glycol monoalkyl ethers (A), which optionally contain propyleneoxy units, preferably conform to the average formula $$R-(O-CH_2-CH_2)_n-OH \qquad (I),$$

where
  R is $C_{1-4}$-alkyl-$(O\text{-propylene})_m$-,
  n is from 5 to 30 and
  m is from 0 to 10,
subject to the proviso that m is $\leq \frac{1}{3}$ of n.
  is preferably from 8 to 24, particularly preferably from 12 to 20.
  m is advantageously $\leq \frac{1}{4}$ of n and is for example from 0 to 4, preferably zero.

In the first process tep (a), the oligomers (C) are first reacted with oligoethylene glycol monoalkyl ether (A), which optionally contains propyleneoxy units, the quantitative ratio of (A) to (C) being selected in such a way that only a portion of the available isocyanate groups is reacted with (A). The mixing ratio of (A) to (C) is advantageously selected in such a way that more than one mole equivalent of (C) is used per mole of (A). One equivalent of (C) is the weight, determinable by titration, which corresponds to one NCO group. One mole equivalent of (C) is this number in grams. The equivalents ratio of (A) to (C) is consequently the ratio of the number of moles of (A) to the number of mole equivalents of (C). This ratio is chiefly within the range from 1/50 to 1/2, preferably within the range of 1/40 to 1/4, particularly preferably within the range from 1/30 to 1/10.

The reaction of (A) with (C) can be carried out in the presence or absence of solvents, in which case suitable solvents are advantageously non-protogenic solvents, for example propylene carbonate, acetone, methyl ethyl ketone or methyl isobutyl ketone. When no (K) is used, the reaction is preferably carried out in the absence of solvents. The reaction takes place for example at elevated temperature, advantageously >30° C., for example at temperatures within the range from 60 to 95° C., and advantageously under an inert atmosphere, for example under argon or preferably nitrogen.

The reaction of (A) with (C) first gives rise to an alkyl polyglycol ether urethane product (U1), which contains urethane groups resulting from the reaction of the hydroxyl group in (A) with a portion of the isocyanate groups in (C) and preferably conforming to the formula

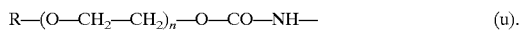

Depending on the molar ratio of (A) to (C), the content of urethane components in (U1) can vary, so that the reaction product (U1), besides urethane components, can also contain unreacted components which are free of urethane groups derived from (A), i.e. fractions of (C) which have essentially not reacted with (A).

Prior to the further reaction with (B), the isocyanate-group-containing products (U1) can optionally be converted into isocyanate-group-containing products (U2) having a higher NCO-based equivalent weight.

The conversion into (U2) can advantageously be effected by inter- and/or intramolecular further reaction of (U1) or also by addition of suitable, preferably low molecular weight, chain extenders (K).

The inter- or intramolecular further reaction of (U1) can be effected by heating, for example at temperatures within the range from 60 to 95° C., since, as the reaction time to prepare (U1) at elevated temperature is extended, the NCO-based equivalent weight will gradually rise beyond that which stoichiometrically corresponds to simple urethane formation (U1). As a result, for example, further NCO groups may be made to become involved, for example through formation of allophanate, uretidione and/or isocyanurate structures. The progress of the reaction can be monitored by determining the equivalent weight based on isocyanate groups.

Suitable chain extenders (K) for the reaction of (U1) with a chain extender (K) are generally difunctional compounds, i.e. compounds which contain at least two (e.g. 2 to 5) reactive hydrogen atoms capable of reaction with isocyanate groups, chiefly hydroxyl groups and/or primary amino groups, and which in particular do not introduce any ionic groups. Suitable (K) for the purposes of the invention include chiefly aliphatic diols, diamines or aminoalcohols which contain 2 to 6 carbon atoms and in which, if they contain 4 to 6 carbon atoms, the aliphatic radicals can optionally be interrupted by oxygen, or also especially water, water being included among the chain extenders (K) insofar as it will take part in a two-step reaction (with $CO_2$ elimination) according to the general reaction scheme

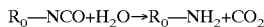

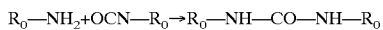

which leads to urea bridging. Specific examples of (K) are ethylene glycol, propylene glycol, butylene glycol, 1,4-butanediol, hexylene glycol, diethylene glycol, triethylene glycol, dipropylene glycol, ethylenediamine, tri-, tetra-, penta- or hexamethylenediamine, ethanolamine, isopropanolamine and water, of which the diols, especially ethylene glycol and propylene glycol, and particularly water are preferred.

The reaction with (K) can advantageously take place in the presence of solvents, preferably within the temperature range from 20 to 95° C., temperatures within the range from 20 to 60° C. being already suitable if the reaction is carried out in the presence of a catalyst of the type known for the preparation of polyurethanes, for example dibutyltin dilaurate, diacetate or dioctoate.

It is surprisingly particularly advantageous for the invention to use a reaction product (U2) in which the isocyanate-based equivalent weight has risen beyond that which stoichiometrically corresponds to simple urethane formation in reaction product (U1). The isocyanate-based equivalent weight of (U2) is advantageously by 1 to 20%, preferably 2 to 15%, more preferably 3 to 12%, higher than that which stoichiometrically corresponds to single urethane formation in (U1). The desired or optimum degree of conversion for a certain combination of starting materials (A) and (C) and optionally (K) can be determined by means of a few preliminary experiments. When a chain extender (K) is used for preparing (U2), then the ratio of the number of moles of (K) to the number of mole equivalents of (U1) is advantageously in the corresponding suitable range for achieving the aforementioned increase in the NCO-based equivalent weight, especially within the range from 0.01 to 0.16 mol of (K), advantageously 0.02 to 0.12 mol of (K), preferably 0.03 to 0.1 mol of (K), per mole equivalent of (U1).

The reaction products (U1) and (U2) are generally mixtures. The products (U1) can thus be for instance random mixtures of differingly converted products or, when, for example, the equivalents ratio of (C)/(A) is greater than the degree of oligomerization in (C), (U1) is particularly a mixture of products which contain a radical derived from (A) and products which do not contain a radical derived from (A). Corresponding further mixtures are formed in (U2).

The reaction products (U1) or preferably (U2) can then be reacted with (B).

The isocyanate-blocking pyrazoles (B) used can generally be any pyrazoles known to be useful for blocking or masking polyisocyanates, for example as described in EP-A 0500495, particularly those wherein the substituents optionally present on the pyrazole ring are non-ionogenic and also non-NCO-reactive (i.e. they do not react with NCO groups and therefore do not interfere with the blocking reaction either). As pyrazoles (B) can advantageously be employed those of the average formula

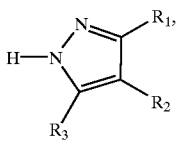

(II)

where
- $R_1$, and $R_2$ $R_3$ are each, independently of the others, hydrogen, alkyl, allyl, aralkyl, aryl or alkoxy or
- $R_2$ and $R_3$ together with the carbon atoms to which they are bonded, form a benzenic ring which is condensed to the pyrazole ring and is optionally substituted with alkyl, aryl or alkoxy.

In the formula (II), the alkyl and alkoxy groups advantageously contain 1 to 3 carbon atoms, aryl is preferably phenyl, aralkyl is preferably benzyl; when $R_2$ and $R_3$ together with the carbon atoms to which they are bonded form a condensed benzenic ring, this benzo ring is preferably unsubstituted. $R_2$ is advantageously hydrogen, $C_{1-3}$-alkyl, benzyl or allyl. $R_1$ and $R_3$ are each, independently of the other, advantageously hydrogen or $C_{1-3}$-alkyl. $C_{1-3}$-Alkyl is preferably methyl. $R_2$ is particularly preferably hydrogen.

Particularly preferred pyrazoles (B) are those of the formula (II) wherein $R_1$ is hydrogen or methyl, $R_2$ is hydrogen and $R_3$ is methyl.

The reaction of the pyrazoles (B) with (U1) or preferably with (U2) can be effected by simply bringing the reagents together, for example by addition of (B) into the reaction product (U1) or preferably (U2), advantageously directly after its synthesis. The blocking of the isocyanate groups with the pyrazole (B) can take place in the presence or absence of a catalyst (e.g. dibutyltin dilaurate, dioctoate or diacetate), preferably in the absence of catalysts. The reaction is exothermic, and initial gentle heating is sufficient to get the reaction going. The reaction is advantageously carried out within the temperature range from 15 to 60° C. The amount used of pyrazole (B) is expediently sufficient to exhaustively block the isocyanate groups which are present in the employed product (U1) or (U2)—which may be determined by titration, for example. The reaction with (B) is advantageously also carried out under an inert atmosphere, for example under argon or preferably nitrogen, as described above for the synthesis of (U1).

The product thus prepared is a mixture (G)—at least to the extent that (U1) or (U2) is a mixture—and is essentially nonionic and self-dispersible in water, i.e. it forms very fine, aqueous dispersions by simple addition of water or by simply stirring it into water, even without the assistance of emulsifiers or other surfactants. The aqueous dispersions (D) of the mixtures (G) also form part of the subject-matter of the present invention. They are preparable in a conventional manner, by simply stirring (G) into water, or vice versa; if desired, it is also possible to add further additives, for example a non-ionogenic, surface-active stabilizer (E) and/or a solubilizer (L).

Suitable non-ionogenic stabilizers (E) are chiefly addition products of ethylene oxide to polypropylene glycol or to an aliphatic and/or aromatic alcohol having, for example, 9 to 24, preferably 11 to 18, carbon atoms, the degree of oxyethylation being advantageously such that the HLB is advantageously $\geq 8$, preferably within the range from 10 to 18. Block polymers of ethylene oxide and propylene oxide which have the appropriate HLB are also suitable. When a non-ionogenic stabilizer (E) is used, it is advantageously used in smaller amounts than (G), for example within the range from 0.5 to 40%, preferably 1 to 20%, based on (G).

The concentration of (G) in the aqueous dispersions (D) is of itself discretionary; for concentrated dispersions (D) it is advantageously within the range from 5 to 70% by weight, preferably 10 to 60% by weight, based on total dispersion (D).

Examples of suitable solubilizers (L) are mono- or oligoalkylene glycols and their $C_{1-4}$-alkyl monoethers (e.g. ethylene glycol, propylene glycol, hexylene glycol, dipropylene glycol, dipropylene glycol monomethyl ether, mono- or diethylene glycol monobutyl ether), ethylene carbonate, propylene carbonate or N-methylpyrrolidone.

When solubilizers (L) are used, their concentration in (D) may vary within wide limits, for example within the range from 1 to 30% by weight, based on the total weight of (D), but is advantageously inferior to the concentration of (G), for example within the range from 5 to 80% by weight of (G).

If desired, the dispersions (D) may include an additive (Z) for protection against microbial damage, especially a microbicide and/or an additive which inhibits fungal and/or bacterial growth. Suitable for this purpose are generally commercially available products, which can be used in the small amounts (e.g. <2% by weight) which are recommended in each case.

The aqueous dispersions (D) of the invention are, in particular, of very fine particle size. The particle size of the dispersed particles is for example within the range from 0.01 to 1 $\mu$m, preferably 0.05 to 0.5 $\mu$m. The dispersions (D) are also very stable in storage—particularly those comprising (E) and/or (L)—and readily pourable. They retain their application and physical properties even after prolonged storage.

The mixtures (G) of the invention, advantageously in the form of their aqueous dispersions (D), serve as auxiliaries in the oil- and/or water-repellent finishing of fibre material with fluorocarbon polymers (F).

Suitable fluorocarbon polymers (F) are generally any of those polymers which contain perfluoro-hydrocarbon radicals ("fluorocarbon radicals") and which are known to be used for oil- and/or water-repellent finishes. The fluorocarbon radicals are chiefly perfluoroalkyl radicals, especially monovalent radicals $R_F$ of the formula

 (f), where p is from 3 to 21, preferably 4 to 16, or also those wherein a fluorine atom has been replaced by a chlorine atom.

These radicals $R_F$ can be linear or also branched; preferably they are linear. They are preferably radicals of the formulae

 (f1)

 (f2)

or

 (f3)

where
q is from 3 to 15, preferably 5 to 13, and
r is from 2 to 12, preferably 2 to 8.

They can for example be attached to a polymer main chain directly or via a low molecular weight aliphatic radical and optionally via an ester or ether bridge; optionally, they may also be attached to the low molecular weight aliphatic radical via an amide group. The polymer main chain is generally a hydrocarbon chain as produced by free-radical polymerization of ethylenically unsaturated monomers, for example from appropriate vinylic or (meth)acrylic monomers.

The radicals $R_F$ can for example also be attached, via a bridging member, to a nitrogen compound, for example to a condensation product of an aldehyde and a urea or melamine, chiefly to etherified methylol derivatives of urea or heterocyclic nitrogen compounds, particularly of an optionally cyclic urea (e.g. N,N'-dimethylolurea, N,N'-dimethylolethyleneurea, N,N'-dimethylolpropyleneurea or N,N'-dimethyloldihydroxyethyleneurea or a precondensate thereof) or of a methylolmelamine (e.g. tri- to hexamethylolmelamine), as condensates which are heat-curable optionally in the presence of suitable catalysts.

The fluorocarbon polymers (F) are chiefly ($F_A$) copolymers which contain constituent comonomer units containing fluorocarbon radicals $R_F$ or ($F_B$) nitrogen-containing polycondensates which contain fluorocarbon radicals $R_F$.

Copolymers ($F_A$) containing fluorocarbon radicals $R_F$ are well known and extensively described in the technical literature, for example in U.S. Pat. Nos. 3849521, 4742140, 5057577 and 5344903 and in EP-A 0198252 and 0294648. Polycondensates ($F_B$) containing fluorocarbon radicals $R_F$ are likewise well known and described in the technical literature, for example in U.S. Pat. Nos. 3362782 and 3510455 and in EP-A 0073364.

It is preferred to use fluorocarbon polymers of the type ($F_A$) for the process of the invention. They are chiefly copolymers of fluorocarbon-radicals-containing monomers (M1) of the formulae

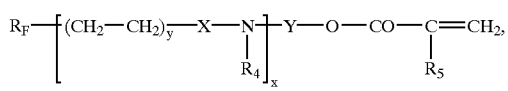 (III)

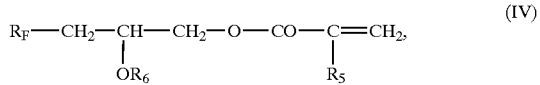 (IV)

 (V)

or

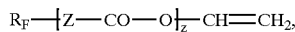 (VI)

where $R_4$ is $C_{1-12}$-alkyl, $R_5$ is hydrogen or methyl, $R_6$ is hydrogen or acetyl, X is —CO— or —SO$_2$—, Y is $C_{2-3}$-alkylene, Z is $C_{1-12}$-alkylene, x is zero or 1, y is zero or 1 and z is zero or 1, and further ethylenically unsaturated non-ionogenic monomers, especially (M2) ethylenically unsaturated non-ionogenic monomers which contain lipophilic hydrocarbon radicals, for example ($C_{9-24}$-alkyl) (meth)acrylates, preferably ($C_{12-20}$-alkyl) (meth)acrylates, and optionally (M3) further non-ionogenic, ethylenically unsaturated monomers which are preferably lower in molecular weight than the first two, for example ($C_{1-8}$-alkyl) (meth)acrylates (wherein alkyl radicals having 6 to 8 carbon atoms may also by cyclic), vinyl chloride, vinylidene chloride, styrene, ethylene or propylene.

If desired, ($F_A$) may also contain minor proportions of (M4) ethylenically unsaturated non-ionogenic comonomers which contain a reactive moiety, chiefly a reactive hydrogen attached via a heteroatom (e.g. nitrogen, sulfur or oxygen) or an epoxy group, as polymerized units. These reactive moieties are especially moieties which, after the copolymerization of the respective monomer, are capable of crosslinking with other parts of the polymer and/or with the substrate and are, for example, hydroxyl, thiol or epoxy groups, each attached via a hydrocarbon radical, and/or a secondary amide group.

Suitable comonomers (M4) are chiefly comonomers (M4 a) of the formula

 (VII), where $R_7$ is hydroxy-$C_{2-4}$-alkyl, —(CH$_2$—CH$_2$—O)$_t$—H, dihydroxy-$C_{3-5}$-alkyl, 3-chloro-2-hydroxypropyl or glycidyl and t is from 1 to 20 or (M4b) comonomers of the formula

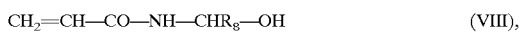 (VIII), where $R_8$ is hydrogen, $C_{1-3}$-alkyl or ω-acetyloxy-$C_{2-4}$-alkyl, and their alkyl ethers, for example ($C_{2-8}$-alkyl) ethers.

Preferred radicals $R_7$ are e.g. 2-hydroxyethyl, 2-hydroxypropyl, 2,3-dihydroxypropyl, glycidyl, 3-chloro-2-hydroxypropyl and radicals of the formula —(CH$_2$—CH$_2$—O)$_1$—H, wherein t is from 1 to 10, preferably 1 to 5.

$R_8$ is preferably hydrogen or 3-acetyloxy-2,2-dimethyl-1-hydroxy-propyl-1.

(M1) can be a single compound or also a mixture, for example a technical grade or random mixture, for example as described in U.S. Pat. Nos. 3,849,521, 4,742,140 or 5,344,903.

Unlike the comonomers (M4), which contain a reactive moiety which, after the free-radical polymerization and after the application of the polymer to the substrate, is capable of crosslinking, the comonomers (M2) and (M3) do not contain such reactive moieties.

As (M2) can be employed one or also more compounds, for example those described in U.S. Pat. No. 5,344,903. Particular preference is given to lauryl (meth)acrylate and stearyl (meth)acrylate.

As (M3) can likewise be employed one or also more compounds, for example those described in U.S. Pat. Nos. 3,849,521 and 5,344,903 or in EP-A 0,294,648, among which $C_{2-8}$-alkyl (meth)acrylates [particularly ethyl (meth)acrylate, n-butyl (meth)acrylate, isobutyl (meth)acrylate, cyclohexyl (meth)acrylate and 2-ethylhexyl (meth)acrylate], vinyl chloride and vinylidene chloride are particularly preferred.

As (M4) can also be employed one or more comonomers, for example those described in U.S. Pat. Nos. 3,849,521 and 5,344,903 or in EP-A 0,294,648, preferably at least one comonomer (M4a) and at least one comonomer (M4b).

The weight ratio of the monomers is advantageously chosen so that the resulting copolymer has the desired water- and oil-repellent effect. Based on the total quantity of the comonomers [i.e. in particular (M1) and (M2) and, if present, (M3) and/or (M4)], the comonomers (M1) are used in an amount which is advantageously within the range from 25 to 90% by weight, preferably within the range from 40 to 90% by weight, particularly preferably within the range from 40 to 75% by weight. The comonomers (M2) are used in an amount which is advantageously within the range from 5 to 50% by weight, preferably within the range from 15 to 35% by weight, based on total comonomers. The comonomers (M3) are used in an amount which is advantageously within the range from 5 to 50% by weight, preferably within the range from 5 to 25% by weight, based on total comonomers. A preferred embodiment also utilizes comonomers (M4) in minor proportions, advantageously up to 20% by weight based on total comonomers. The amount of (M4) employed is preferably 0.1 to 20% by weight, particularly preferably 2 to 15% by weight, for example 0.2 to 5% by weight of (M4a) and 1.5 to 12% by weight of (M4b). The copolymerization can take place in a manner conventional per se, advantageously in aqueous emulsion in the presence of suitable emulsifiers and optionally solubilizers. Any suitable emulsifiers can be used, especially non-ionogenic and/or cationic emulsifiers. Examples of suitable non-ionogenic emulsifiers are addition products of ethylene oxide with higher fatty alcohols (e.g. with 9 to 24 carbon atoms in the fatty radical) or with fatty acid partial esters of oligoalkanols such as glycerol, sorbitol or sorbitan wherein the fatty acid radicals advantageously contain 12 to 24 carbon atoms. The HLB value of the non-ionogenic surfactants is advantageously $\geq 10$, preferably within the range from 12 to 18. Examples of cationic surfactants are simple fatty amines having, for examples, 12 to 24 carbon atoms in the fatty radical, or protonation or quaternization products thereof. Small amounts of the emulsifiers are sufficient for the polymerization in aqueous emulsion, for example 1 to 20% by weight, preferably 2 to 15% by weight, based on the total monomers or respectively on (F).

When solubilizers are used, their concentrations are advantageously within the range from 5 to 50% by weight based on total monomers or on (F). Examples of suitable solubilizers are customary compounds as mentioned above as (L), for example mono- or oligoalkylene glycols and their lower alkyl ethers. If desired or required, other customary additives are used for the polymerization, for example polymerization regulators and/or catalysts.

The polymerization advantageously takes place at elevated temperature, for example within the temperature range from 40 to 90° C., advantageously under an inert atmosphere, for example under nitrogen. The amount of water for the emulsion polymerization is advantageously chosen so that an (F)-dispersion of the desired concentration is produced, for example of a concentration within the range from 5 to 50% by weight, advantageously 10 to 40% by weight, preferably 15 to 30% by weight. The desired emulsion form can expediently also be obtained by suitable stirring.

The mixtures (G) of the invention serve as additives for improving the oil- and water-repellent effect of (F)-finishes and their fastnesses, especially fastnesses to cleaning. Suitable substrates for the finish of the invention include any materials known to be given an oil- and water-repellent finish with fluoro-carbon polymers, for example fibrous materials composed of natural, semisynthetic or fully synthetic materials, especially optionally modified cellulose (e.g. cotton, hemp, jute, viscose rayon, cellulose acetates) and blends thereof with synthetic fibres (especially cotton/polyester, cotton/polyamide, cotton/polyurethane, cotton/viscose, cotton/polyester/polyurethane), and synthetic fibres (e.g. polyamide, polyester, polyacrylonitrile). The fibrous materials can be present in any desired suitable processing form used for finishing with fluorocarbon polymers, especially as wovens, knits, carpets, felts, webs and nonwovens, or else textiles coated with a polymeric film as are used for example for manufacturing weatherproof products (raincoats, anoraks, windcheaters, tents, tarpaulins, etc.), or products which are cleaned by shampooing (e.g. carpets, upholstery covers). The finishing can be carried out before or also after the making up.

The mixtures (G) of the invention are advantageously applied together with (F) to the substrate to be finished; for this purpose, it is possible to combine them, advantageously in the form of their aqueous dispersions (D), with (F) in a suitable treatment liquor, or (D) can for example be formulated beforehand with (F) to form a stock liquor, or (D) can be formulated with a polymer (F) during or after the synthesis of (F) into an aqueous, concentrated composition. The polymers (F) are advantageously employeded in the form of aqueous dispersions (which may include conventional additives, such as emulsifiers or solubilizers) whose concentration of (F) is for example within the range from 5 to 50% by weight, preferably 10 to 40% by weight. The aqueous compositions (P) comprising (G) and (F), especially the concentrated compositions (P1), the prediluted compositions (P2) (especially stock liquors) and the diluted compositions (P3) (particularly treatment liquors), likewise form part of the subject-matter of the present invention. These compositions, especially (P1), advantageously comprise at least one component (L) and/or (Z) which may each derive for example from the production of a corresponding (F)-dispersion and/or from the production of (D), or may also be added separately.

The weight ratio of (G) to (F) is advantageously chosen so that a marked improvement in the effect of (F) in the finish is brought about. The weight ratio of (G)/(F) is advantageously within the range from 5/100 to 120/100, preferably 10/100 to 90/100, particularly preferably 20/100 to 70/100.

The concentration of [(G) +(F)] in the aqueous compositions (P) can vary within wide limits, for example within the range from 0.1 to 70% by weight.

The concentration of [(G) +(F)] in the concentrated, aqueous compositions (P1) comprising (G) and (F) is for example within the range from 10 to 70% by weight, preferably from 15 to 50% by weight, based on the total composition (P1). In the prediluted, aqueous compositions (P2) comprising (G) and (F), the concentration of [(G) +(F)] is for example within the range from 0.3 to 30% by weight, preferably 1.5 to 15% by weight, based on the total composition (P2). In the aqueous treatment liquors comprising (G) and (F), i.e. in the compositions (P3), the concentration of [(G) +(F)] is for example from 0.1 to 10% by weight, preferably 0.2 to 5% by weight, based on the total composition (P3).

If desired, the finish may be combined with another customary synthetic resin finish, for example a synthetic resin finish based on optionally cyclic methylolureas or methylolmelamines or also precondensates thereof, for example as described above as precursors for the production of ($F_B$). If the finishing is carried out in the presence of synthetic resin, the corresponding synthetic resin precursor and any catalyst which may be required may also be present in (P3).

The pH of the treatment liquor can vary within wide limits, for example within the range from 2.5 to 8, preferably 4 to 7.5, in which the corresponding suitable or optimal pH can be chosen according to the selected finish combination.

The finishing can be effected in a manner conventional per se, chiefly by means of impregnation processes, for example by padding, by dipping, by spraying, by knife-coating or by curtain coating, and similar continuous or discontinuous processes. The presence of the additive (G) or respectively (D) according to the invention makes it possible to reduce the amount of polymer (F) required, especially the requisite minimum or optimum amount to obtain effective results, to a substantial extent. The concentration of (F) based on the dry substrate is for example within the range from 0.1 to 5%, preferably 0.2 to 3%, by weight. The application of the treatment liquor to the substrate can be followed by a suitable thermofixation as required for the respective polymers (F) and optionally synthetic resin, for example within the temperature range from 110 to 220° C., preferably 120 to 200° C., for example for 10 seconds to 2 minutes, an optimal fixation temperature and time being choosable as a function of the type and consistency of the substrate, the presence or absence of synthetic resin, and the composition and concentration of the liquor. The thermofixation is advantageously preceded by predrying, for example within the temperature range from 100 to 140° C., for example for 30 seconds to 5 minutes.

The presence of the additive (G) or respectively (D) of the invention makes it possible to enhance the effect of the (F) finish and improve its fastnesses, or respectively to substantially reduce the amount of polymer (F) required for achieving a certain effect level. This means that (G), preferably in the form of (D), can be used as an effective extender or blending agent for (F), so that a minimal amount of fluorocarbon polymer (F) can be used to obtain optimal oil- and water-repellent finishes which, moreover, have noteworthy fastnesses, especially fastnesses to cleaning (chiefly fastnesses to shampooing and washing), while the specific properties are practically unimpaired or may even be improved. Owing to the particularly good fastnesses to cleaning, it is additionally also possible for the finished materials to be for example washed in a domestic washing machine (e.g. windcheaters or raincoats and the like) and air dried or also tumble dried, or to be shampooed (e.g. carpets, upholstery covers and the like) and air dried, without a subsequent heat treatment, for example ironing, being absolutely necessary.

In the Examples hereinbelow, parts and percentages are by weight and the temperatures are reported in degrees Celsius.

EXAMPLES

Examples 1 to 5

Production of Mixtures (G) and Dispersions (D)

Example 1

222.1 parts of a hexamethylene diisocyanate/biuret prepolymer (having a viscosity of 10,000 mPas at 23° C., a functionality of 3.7 and an isocyanate-based equivalent weight of 192) are reacted at 70° C. under nitrogen with 40.5 parts of polyethylene glycol monomethyl ether (hydroxyl number=75) until an equivalent weight (based on -NCO) of 267 is present. The product is then cooled down to 40–50° C., and 97.4 parts of 3,5-dimethylpyrazole are added. After 3 hours at 50° C. there are no further free titratable isocyanate groups. 830 parts of water are then added to obtain about 1190 parts of a fine, milky dispersion.

Example 2

47.45 parts of a methylenephenyl isocyanate prepolymer (having a viscosity of 600 mPas at 25° C., a functionality of 2.9 and an isocyanate-based equivalent weight of 138) are reacted at 80° C. under nitrogen with 12.55 parts of polyethylene glycol monomethyl ether (hydroxyl number=75) until an equivalent weight of 193 (based on NCO groups) is obtained. Concurrently, 203.88 parts of hexamethylene diisocyanate polyisocyanurate (trimer having a viscosity of 3000 mPa at 23° C., a functionality of 3.7 and an equivalent weight of 197.5) are reacted at 80° C. under nitrogen with 36.12 parts of polyethylene glycol monomethyl ether (hydroxyl number=75) until an equivalent weight (based on NCO groups) of 252 is present. The two reaction products are then mixed together and admixed at 40 to 50° C. with 125 parts of 3,5-dimethylpyrazole. After 3 hours there are no titratable isocyanate groups left, and 21 parts of an ethylene oxide/propylene oxide block copolymer having a hydroxyl number of 25.5, a molecular weight of 4400 and a polyethylene glycol weight fraction of about 10% are added. This is followed by the addition of 957 parts of water at 50° C., and the batch is allowed to cool. 1403 parts of a fine milky dispersion are obtained.

Example 3

237 parts of a hexamethylene diisocyanate polyisocyanurate (trimer having a viscosity of 3000 mPas at 23° C., a functionality of 3.7 and an equivalent weight based on NCO groups of 197.5) are reacted at 70° C. under nitrogen with 42 parts of polyethylene glycol monoethyl ether (hydroxyl number=75) until an equivalent weight (based on NCO groups) of 268 is present. The batch is then cooled down to 40–50° C., 103 parts of 3,5-dimethylpyrazole are added, and the reaction is left to proceed to completion over 3 hours. Then 19 parts of isooctylphenol poly-10-ethylene glycol ether are added, followed by 545.5 parts of water at 50° C., and the batch is allowed to cool down to room temperature. 947.5 parts of a very fine dispersion are obtained which is stable in storage.

Example 4

512.2 parts of hexamethylene diisocyanate polyisocyanurate (trimer alongside penta- and heptamer) (having a viscosity of 3650 mPas at 23° C. and an equivalent weight based on NCO groups of 195.3) are mixed at 50° C. with 90 parts of polyethylene glycol monomethyl ether (hydroxyl number=73) and then admixed with 144 parts of acetone. A clear solution is obtained which has a temperature of 31° C. Then 0.59 part of dibutyltin diacetate is added, and the temperature rises to 37° C. in the course of a few minutes. Then 3.2 parts of water are added, and the temperature rises to 36° C. It is then raised to 41–43° C., and $CO_2$ is found to evolve. As soon as the evolution of gas ceases, which is the case about 60 minutes after the addition of the water, a start is made on the addition of 206.1 parts of 3,5-dimethylpyrazole. The addition takes 1 hour during which the temperature is maintained below 53° C. The batch is then heated to 60° C., and the acetone is distilled off at that temperature. A clear, viscous mass is obtained which is admixed with 40.3 parts of tridecanol poly-6.5-ethylene glycol ether and cooled to 45° C. Then 1168 parts of water at 45° C. are added over 60 minutes with vigorous stirring. A fine, milky dispersion is obtained which is allowed to cool down to room temperature.

Example 5

512.2 parts of hexamethylene diisocyanate polyisocyanurate (trimer alongside penta- and heptamer) (having a viscosity of 3650 mPas at 23° C. and an equivalent weight based on NCO groups of 195.3) are mixed at 50° C. with 90 parts of polyethylene glycol monomethyl ether (hydroxyl number=73) and then admixed with 144 parts of acetone. A clear solution is obtained which has a temperature of 31° C. Then 0.59 part of dibutyltin diacetate is added, and the temperature rises to 37° C. in the course of a few minutes. Then 11.02 parts of anhydrous ethylene glycol, dissolved in 66 parts of acetone, are added, and the temperature is raised to 50° C. The batch is then left to react at 50° C. until the ethylene glycol has completely reacted with the polyisocyanate, which requires about 60 minutes. Then 206.1 parts of 3,5-dimethylpyrazole are added over 1 hour at 45 to 50° C. so that the temperature stays below 53° C. The batch is then heated to 60° C., and the acetone is distilled off at that temperature. A clear, viscous mass is obtained which is admixed with 40.3 parts of tridecanol poly-6.5-ethylene glycol ether and cooled to 45° C. Then 1168 parts of water at 45° C. are added over 60 minutes with vigorous stirring. A fine, runny, milky dispersion is obtained which is cooled down to room temperature.

Examples 6 to 10

Production of Products (F) and their Dispersions

Example 6

A flask is charged with a mixture of the following compounds:
- 125 g of monomer of the formula $CF_3-(CF_2)_q-(CH_2)_2-O-CO-C(CH_3)=CH_2$ (mixture of compounds where q=7, 9 and 11 in a weight ratio of 5:3:1),
- 100 g of $CH_2=CH-CO-O-C_{18}H_{37}$,
- 1 g of $CH_2=CH-CO-O-C_{12}H_{25}$,
- 17 g of N-methylolmethacrylamide,
- 6 g of glycidyl methacrylate,
- 10 g of N-butoxymethylmethacrylamide,
- 586 g of deionized water,
- 120 g of dipropylene glycol methyl ether,
- 1 g of n-dodecyl mercaptan,
- 15 g of stearylamine acetate and
- 5 g of poly-(20)-oxyethylene sorbitan monooleate, and the mixture is initially stirred for 1 hour at 60° C. under a stream of nitrogen to form a fine emulsion. After addition of 9 g of azobisisobutylamidine hydrochloride in 25 g of water the batch is stirred for 4 hours at 55° C. in a stream of nitrogen while the polymerization proceeds. Gas chromatography confirms that the conversion is more than 99%. The dispersion obtained contains the fluorocarbon copolymer in a concentration of 25.8% by weight.

Example 7

Example 6 is repeated with the difference that a mixture of the following compounds is employed:
- 43.5 g of monomer of the formula $CF_3-(CF_2)_q-(CH_2)_2-O-CO-C(CH_3)=CH_2$ (mixture of compounds where q=7, 9 and 11 in a weight ratio of 5:3:1),
- 8 g of $CH_2=CH-CO-O-C_{18}H_{37}$,
- 8 g of $CH_2=CH-CO-O-C_{12}H_{25}$,
- 5.28 g of N-methylolmethacrylamide,
- 1.76 g of glycidyl methacrylate,
- 0.88 g of N-butoxymethylmethacrylamide,
- 262.8 g of deionized water,
- 32 g of dipropylene glycol,
- 0.2 g of n-dodecylmercaptan,
- 3.2 g of stearylamine acetate and
- 1.6 g of poly-(20)-oxyethylene sorbitan monooleate.

The dispersion obtained contains the fluorocarbon copolymer in a concentration of 17.8% by weight.

Example 8

A flask is charged with a mixture of the following compounds:
- 125 g of monomer of the formula $CF_3-(CF_2)_q-(CH_2)_2-O-CO-C(CH_3)=CH_2$ (mixture of compounds where q=7, 9 and 11 in a weight ratio of 5:3:1),
- 35 g of $CH_2=CH-CO-O-C_{18}H_{37}$
- 17 g of N-methylolmethacrylamide,
- 5 g of glycidyl methacrylate,
- 11 g of N-butoxymethylmethacrylamide
- 580 g of deionized water
- 120 g of dipropylene glycol methyl ether
- 0.8 g of n-dodecyl mercaptan
- 10 g of stearylamine acetate and
- 15 g of poly(-20)-oxyethylene sorbitan monooleate, and the mixture is initially stirred for 1 hour at 60° C. under a stream of nitrogen to form a fine emulsion. Then, 50 g of vinylidene chloride are added and, after addition of 9 g of azobisisobutylamidine hydrochloride in 25 g of water, the batch is stirred for 4 hours at 55° C. in a stream of nitrogen while the polymerization proceeds. Gas chromatography confirms that the conversion is more than 99%. The dispersion obtained contains the fluorocarbon copolymer in a concentration of 25.8% by weight.

Example 9

Aqueous 21% dispersion of the copolymer of 14% of perfluoroacrylate as in Example 6, 5% of vinyl chloride and 2% of 2-ethylhexyl acrylate, additionally containing 1% of emulsifiers.

Example 10

Aqueous dispersion containing 30% of the copolymer of 21% of perfluoroacrylate as in Example 6, 6% of vinyl chloride and 3% of further components (emulsifiers and crosslinking monomers) and 15% of dipropylene glycol.

Examples 11 to 25

Production of Compositions (P)

Example 11

200 parts of the fluorocarbon polymer dispersion obtained according to Example 6 are mixed with 40 parts of the dispersion obtained according to Example 1. The formulation obtained is stable in storage.

Examples 12 to 15

200 parts of the fluorocarbon polymer dispersion obtained according to Example 6 are mixed with 40 parts of the dispersion obtained according to Example 2, 3, 4 or 5. The formulations obtained are stable in storage.

Examples 16 to 25

Analogously as in Examples 11 to 15, the fluorocarbon copolymer dispersions according to Examples 7 to 10 are employed in place of the fluorocarbon polymer dispersion obtained according to Example 6. The formulations obtained are also stable in storage.

Application Example A

A 122 g/m² cotton cretonne fabric (bleached) is padded on a Mathis HVF 41496 laboratory pad-mangle with an aqueous liquor of the following composition:

5 g/l of product according to Example 1, 2, 3, 4 or 5

20 g/l of fluorocarbon copolymer dispersion prepared according to Example 6

2 ml/l of 60% acetic acid to a pick-up of 80% and then dried and flash cured (180° C./30 seconds effective time) on a Mathis LTE 21496 Lab dryer. The samples are then conditioned (24 hours, 65% relative humidity, 20° C.). Half are then washed five times (40° C., ISO standard 6330) and then dried (1 minute, 140° C., Mathis LTE 24196 Lab dryer) and pressed at 160° C. for 20 seconds (Schröter Press).

The oil test and spray test ratings of the washed samples determined according to the standard test methods AATCC 22 and AATCC 118 are significantly higher than those of the respective blanks (i.e. without the product of Example 1, 2, 3, 4 or 5).

Application Example B

A 122 g/m² cotton cretonne fabric (bleached) is padded and treated in the same way as described in Application Example A with an aqueous liquor of the following composition:

10 g/l of product according to Example 1, 2, 3, 4 or 5

30 g/l of fluorocarbon copolymer dispersion prepared according to Example 6

20 g/l of dihydroxyethylene-N,N'-dimethylolurea 5 g/l of magnesium chloride hexahydrate 2 ml/l of 60% acetic acid.

The oil test and spray test ratings of the washed samples determined according to the standard test methods AATCC 22 and AATCC 118 are significantly higher than those of the respective blanks (i.e. without the product of Example 1, 2, 3, 4 or 5).

Application Example C

Polyester/cotton gabardine (67/33) is padded in the same way as in Application Example A with an aqueous liquor of the following composition:

20 g/l of fluorocarbon copolymer dispersion prepared according to Example 6

10 g/l of product according to Example 1, 2, 3, 4 or 5

2 ml/l of 60% acetic acid to a pick-up of 80% and then dried and flash cured (180° C./30 seconds effective time) on a Mathis LTE 21496 Lab dryer. The samples are then conditioned (24 hours, 65% relative humidity, 20° C.). Half are then washed five times (40° C., ISO standard 6330) and then dried (1 minute, 140° C., Mathis LTE 24196 Lab dryer) and pressed at 160° C. for 20 seconds (Schröter Press).

The fastness ratings of the washed samples, determined according to the DIN 5388 standard method (Bundesmann short shower test—bead-off effect after 1 minute and after 10 minutes), are significantly higher than those of the respective blanks (i.e. without the product of Example 1, 2, 3, 4 or 5).

Application Example D

Polyamide taffeta is padded and treated in the same way as described in Application Example A with an aqueous liquor of the following composition:

30 g/l of the mixture prepared according to Example 11

2 ml/l of 60% acetic acid.

The oil test and spray test ratings of the washed samples determined according to the standard test methods AATCC 22 and AATCC 118 are significantly higher than those of the respective blanks (i.e. without the product of Example 11).

Instead of the fluorocarbon copolymer dispersion of Example 6, the corresponding amounts of fluorocarbon copolymer dispersion according to Example 7, 8, 9 or 10 or also commercially available fluorocarbon copolymer dispersions such as: Oleophobol S (Pfersee Chemie, Germany), Zepel 8070 (DuPont, USA), Asahi Guard AG 310, 915 or 923 (Asahi Glass, Japan) or Rucogard AFS or AFC (Rudolf Chemie, Germany) may be employed in Application Examples A, B and C.

Oil test and spray test ratings are obtained on the washed samples which are also significantly higher than those of the respective blanks (i.e. without the product of Example 1, 2, 3, 4 or 5).

In Application Example D, instead of the mixture of Example 11, corresponding amounts of the mixtures according to Examples 12–25 may be employed.

What is claimed is:

1. A mixture (G), self-dispersible in water, of oligomeric isocyanates (C) reacted in part with polyethylene glycol monoalkyl ether (A), which optionally contains propyleneoxy units, and optionally with a chain extender (K) and exhaustively blocked with an isocyanate-blocking pyrazole (I).

2. A mixture (G) according to claim 1, wherein the polyethylene glycol monoalkyl ethers (A), which optionally contain propyleneoxy units, conform to the average formula $$R-(O-CH_2-CH_2)_n-OH \qquad (I)$$

where

R is $C_{1-4}$-alkyl-(O-propylene)$_m$—, n is from 5 to 30 and m is from 0 to 10, with the proviso that m is ≦⅓ of n.

3. A mixture (G) according to claim 1, characterized in that (K) is water.

4. A process for the production of mixtures (G) according to claim 1, characterized in that in a first process step (a) a minor proportion of the isocyanate groups in the oligomeric isocyanate (C) are reacted in the absence of protogenic solvents with polyethylene glycol monoalkyl ether (A), which optionally contains propyleneoxy units, to form a product (U1) and this product (U1) is then optionally converted into a product (U2) which has a higher NCO-based equivalent weight and which still contains reactive NCO groups, and in a second process step (b) the remaining isocyanate groups are exhaustively blocked with isocyanate-blocking pyrazole (B).

5. A process according to claim 4, characterized in that the equivalents ratio of (A)/(C) is within the range from 1:2 to 1:50.

6. A process according to claim 4, characterized in that in process step (a) the treatment of (U1) is carried on at 60–95° C. until the isocyanate-based equivalent weight of product (U2) has risen beyond that corresponding stoichiometrically to urethane formation in (U1).

7. A process according to claim 6, characterized in that in process step (a) the treatment of (U1) is carried on at 60–95° C. until the isocyanate-based equivalent weight of product (U2) has risen by 1 to 20% beyond that corresponding stoichiometrically to urethane formation in (U1).

8. A process according to claim 4, characterized in that in process step (a) (U1) is reacted with a chain extender (K) in such a way that the isocyanate-based equivalent weight of product (U2) is 1 to 20% higher than that corresponding stoichiometrically to urethane formation in (U1).

9. The mixtures (G) obtainable by the process of claim 4.

10. An aqueous dispersion (D) of a mixture (G) according to claim 1.

11. An aqueous dispersion (D) according to claim 10, further comprising a non-ionogenic, surface-active stabilizer (E) and/or a solubilizer (L) and/or an additive (Z) to control microbial damage.

12. A process for the production of aqueous dispersions (D) according to claim 10, characterized in that a mixture (G) of oligomeric isocyanates (C) reacted in part with polyethylene, glycol monoalkyl ether (A), which optionally contains propyleneoxy units, and optionally with a chain extender (K) and exhaustively blocked with an isocyanate-blocking pyrazole (B), is mixed with water and optionally admixed with at least one further additive.

13. A method for the application of a mixture (G), self-dispersible in water, of oligomeric isocyanates (C) reacted in part with polyethylene, glycol monoalkyl ether (A), which optionally contains propyleneoxy units, and optionally with a chain extender (K) and exhaustively blocked with an isocyanate-blocking pyrazole (B), comprising providing (G) as an auxiliary in the finishing of fibrous material with oleophobicizing and/or hydrophobicizing finishing agents (F) which are fluorocarbon-radicals-containing polymers.

14. The method according to claim 13, characterized in that (G) and (F) are provided in the form of an aqueous composition (P) containing (G) and (F).

15. An aqueous composition (P) comprising (G) and (F), wherein (G) is a mixture, self-dispersible in waters of oligomeric isocyanates (C) reacted in part with polyethylene, glycol monoalkyl ether (A), which optionally contains propyleneoxy units, and optionally with a chain extender (K) and exhaustively blocked with an isocyanate-blocking pyrazole (B), and (F) is an oleophobicizing and/or hydrophobicizing finishing agent which is a fluorocarbon-radicals-containing polymer.

16. A process for the finishing of textile material by impregnation methods from an aqueous liquor, optionally together with a synthetic resin finish, with thermofixation, comprising contacting the textile material with the mixture (G) of claim 1.

17. A method for the application of an aqueous dispersion (D) of a mixture (G), self-dispersible in water, of oligomeric isocyanates (C) reacted in part with polyethylene, glycol monoalkyl ether (A), which optionally contains propyleneoxy units, and optionally with a chain extender (K) and exhaustively blocked with an isocyanate-blocking pyrazole (B), comprising providing the mixture (G) in said aqueous dispersion (D) as an auxiliary in the finishing of fibrous material with oleophobicizing and/or hydrophobicizing finishing agents (F) which are fluorocarbon-radicals-containing polymers.

* * * * *